Patented Aug. 13, 1929.

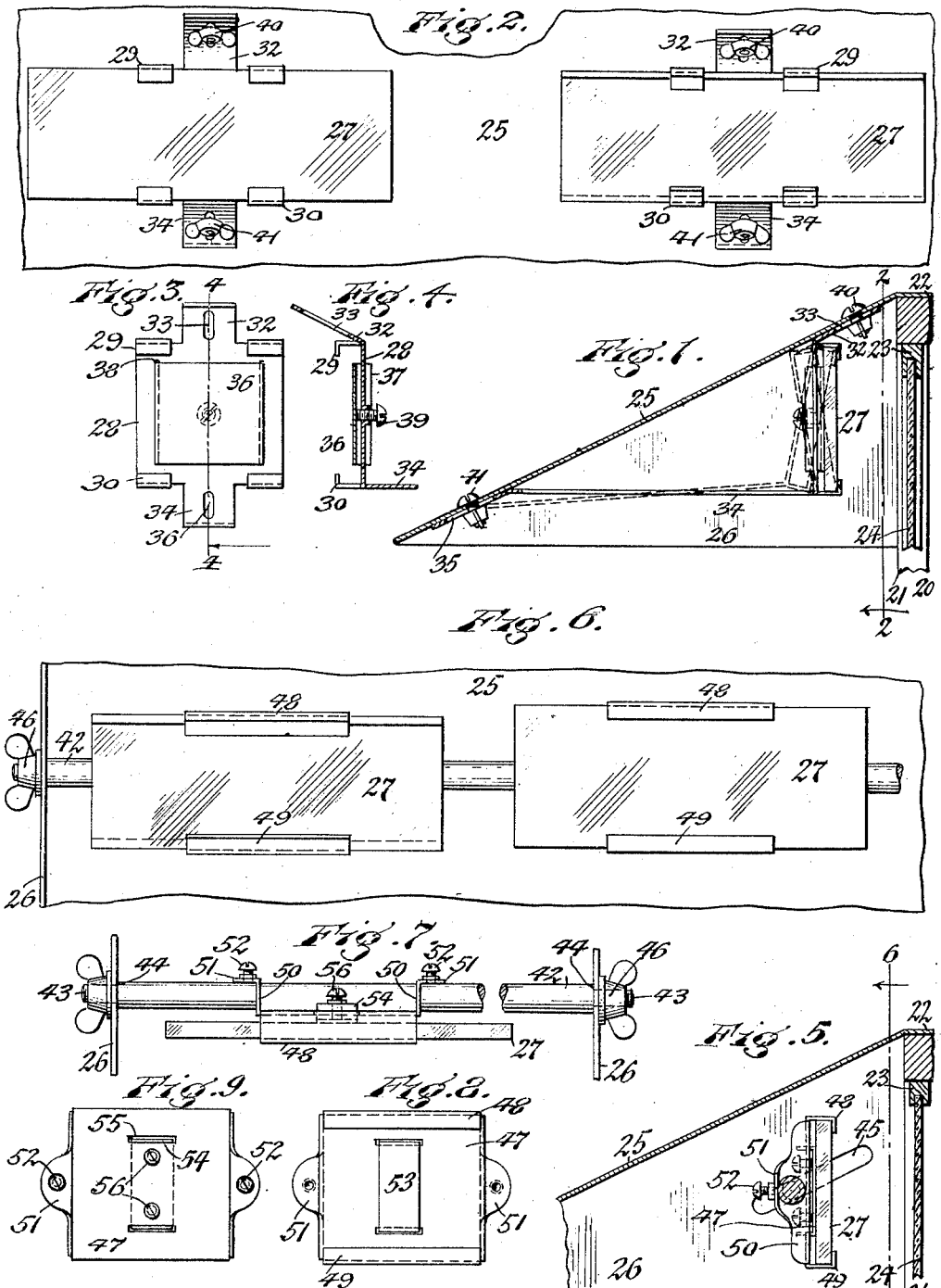

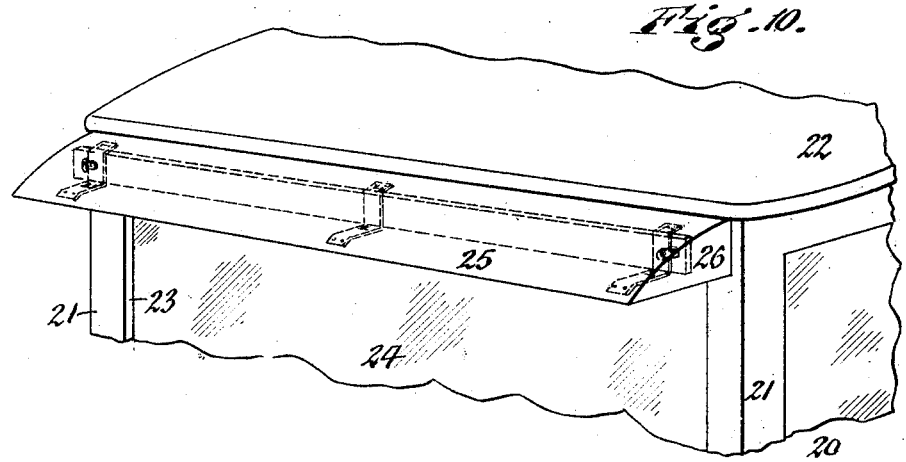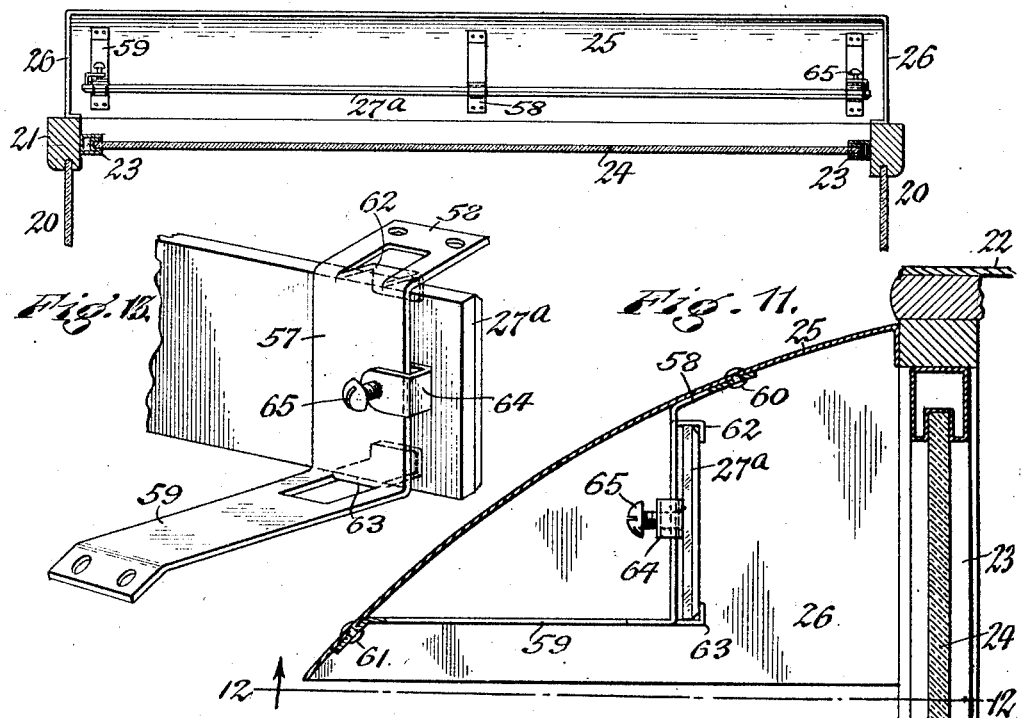

1,724,029

UNITED STATES PATENT OFFICE.

WILLIAM LA HODNY, OF BUFFALO, NEW YORK, ASSIGNOR TO STANDARD MIRROR COMPANY, INC., OF BUFFALO, NEW YORK, A CORPORATION OF NEW YORK.

REAR-VIEW MIRROR FOR AUTOMOBILES.

Application filed August 17, 1925. Serial No. 50,598.

This invention relates to a rear view mirror for use on automobiles in order to enable the driver and passengers in a car to observe the condition of the traffic in rear of the same.

Heretofore such rear view mirrors have usually been arranged on the inside of the driver's compartment and mounted either on the inner or rear side of the windshield or on a stationary part of the cab or compartment adjacent to the windshield so that these mirrors projected a sufficient extent to form an obstruction against which the heads of persons were liable to strike when entering or leaving the car and thus cause serious injury. In attempting to overcome this objection it has been customary to round off the corners of the mirrors but even this is not satisfactory inasmuch as persons are still liable to be injured by striking their heads against the same.

It is the object of this invention to so arrange and mount rear view mirrors on cars that persons are free to enter and leave the car without liability of being injured and still permit of obtaining a clear view of the roadway in rear of the car and also protect the mirror against the weather.

With this end in view this invention consists in arranging the rear view mirror on the exterior of the car in front of the windshield and below the visor which projects forwardly from the latter so that the mirror operates effectively to give a clear view of the traffic in rear of the car and still be protected from rain and snow, and at the same time positively avoiding all possibility of persons striking their heads against the mirror upon entering or leaving the car.

In the accompanying drawings:—

Figure 1, is a fragmentary vertical longitudinal section of the upper front part of an automobile cab and the visor projecting forwardly from the upper part of the windshield thereof and supporting a rear view mirror in accordance with one form of mounting which is constructed in accordance with my invention.

Figure 2, is a fragmentary vertical transverse section taken on line 2—2, Fig. 1, looking forwardly.

Figure 3, is a front view of one of the brackets for supporting a mirror similar to that shown in Figs. 1 and 2.

Figure 4, is a vertical longitudinal section taken on line 4—4, Fig. 3.

Figure 5, is a view similar to Fig. 1 and showing a modified form of this invention.

Figure 6, is a fragmentary vertical cross section taken on line 6—6, Fig. 5 and looking forwardly.

Figure 7, is a fragmentary bottom plan view of the rear view mirror mounting, shown in Fig. 6.

Figure 8, is a front elevation of the bracket shown in Figs. 5, 6 and 7.

Figure 9, is a rear elevation of the same.

Figure 10 is a perspective view of an automobile cab and visor equipped with another form of mounting for the rear view mirror which embodies my invention.

Figure 11, is a vertical longitudinal section of the same, on an enlarged scale.

Figure 12, is a horizontal section, taken on line 12—12, Fig. 11, on an enlarged scale.

Figure 13, is a perspective view showing a rear view mirror supported by means of a bracket similar to that shown in Figs. 10, 11 and 12.

Similar characters of reference indicate like parts throughout the several views.

Referring to the construction shown in Figs. 1-4, 5, 7 and 10-12, the numeral 20 represents the cab or passenger compartment of an automobile which consists generally of upright stanchions 21, arranged at the front ends of the side walls, a canopy or roof 22 arranged over the passenger's compartment, a windshield arranged in front of the passenger's compartment and between the stanchions 21, and consisting, for example, of a marginal frame 23 and a transparent pane 24 of glass mounted in the frame and a visor projecting forwardly from the upper part of the canopy or roof and the adjacent part of the windshield and consisting of a forwardly curved or inclined top 25 and two vertical side walls 26 depending from opposite longitudinal edges of the top 25.

The present invention consists generally in mounting rear view mirrors externally of the passenger's compartment so that all danger of passengers coming into contact with the rear view mirror upon entering and leaving the car is avoided, this mirror being arranged in front of the windshield and below the visor and mounted on the latter so as to be protected from rain, snow and sleet.

As an example of one installation of rear view mirrors embodying the present invention that shown in Figs. 1, 2, 3 and 4 is constructed as follows:—

Although Fig. 2 shows two rear view mirrors 27, 27, arranged side by side horizontally and transversely in front of the windshield and below the visor it is to be understood that this invention is equally applicable to a single short mirror or to one long mirror extending continuously from side to side of the windshield and the visor.

The bracket which supports each mirror in accordance with the construction shown in Figs 1–4 is designed to be attached to the under side of the top of the visor and to permit the mirror which is carried thereby to be arranged either in a vertical position or to be tipped more or less into the desired angle which will give the driver of the car or the passengers therein the best view of the road in rear of the car. The means for this purpose, shown in Figs. 1–4 consists of a bracket which comprises an upright body plate 28 arranged at the back of the mirror and provided at its upper and lower edges with upper and lower opposing hooks 29, 30 which project rearwardly and into engagement with the upper and lower edges of the mirror, an upper arm 32 projecting rearwardly from the upper edge of the body plate 28 and provided with a longitudinal slot 33, and a lower arm 34 projecting forwardly from the lower edge of the body plate and provided at its front end with a longitudinal slot 35.

The upper and lower arms 32 and 34 are connected with the central parts of the upper and lower edges of the body plate while the hooks 29 and 30 are arranged on the upper and lower edges of this body plate on opposite sides of the arms 32 and 34 and preferably at the extremities of this plate, as best shown in Fig. 3.

The rear view mirror 27 is securely held against displacement on the bracket by means of a clamping device consisting preferably of a presser plate 36 engaging with the back of the mirror and provided at its opposite vertical edges with flanges 37 projecting forwardly through upright slots 38 in the body plate and a clamping screw 39 engaging with a threaded opening in the central part of the body plate and bearing against the back side of the presser plate 36 whereby the latter is engaged with the back of the mirror and its face is held firmly in engagement with the rearwardly projecting hooks 29 and 30 so that the mirror is not likely to become displaced due to the vibrations of the car when the same is in use. The body plate, attaching arms and hooks above described are preferably constructed of a single sheet of metal thereby simplifying the construction and reducing its cost of manufacture. The upper attaching arm 32 is bent upwardly at an angle so that it fits against the upper side of the visor top 25 and the same is adjustably connected therewith by means of a bolt 40 passing through the slot 33 of this arm and the adjacent part of the visor top, as shown in Figs. 1 and 2.

The front end of the lower attaching arm 34 is bent downwardly at an angle to fit the under side of the canopy top and the same is adjustably connected with the adjacent part of the canopy top by means of a clamping bolt 41 passing through the longitudinal slot 35 of the lower attaching arm and the adjacent part of the canopy top, as shown in Figs. 1 and 2.

As shown in Fig. 1, the mirror is arranged in a vertical position which may be satisfactory for one driver of a car and other conditions. If, however, it is necessary to tilt the rear view mirror in one direction or the other in order to meet other conditions or a driver who is comparatively short or unusually tall it is possible to meet these conditions by bending either the upper or the lower arm of the body plate the required extent until the mirror carried by the body plate is arranged at the desired angle. Such bending of the bracket operates to shift the position of one or the other arms of the bracket in a direction lengthwise of the canopy top but owing to the slots 33 and 35 in the upper and lower arms thereof it is possible to effect such adjustment and still reliably secure the bracket to the visor top. In Fig. 1, such adjustments of the bracket are represented by dotted lines.

Instead of mounting the mirrors on the top of the visor the same may be mounted on the side walls 26 thereof, as shown in Figs. 5–8. In this construction a plurality of mirrors 27, are arranged horizontally and transversely side by side and each mirror is mounted by means of a bracket on a horizontal transverse supporting rod 42 which is arranged transversely below the visor top and having its opposite ends 43 reduced so as to form outwardly facing shoulders 44 thereon. These reduced ends of the supporting rod 42 pass through longitudinal slots 45 in the side walls 26 of the visor and the same are adjustably secured therein by engagement of the shoulders 44 thereof with the inner sides of the walls 26, and clamping screw nuts 46 arranged on the threaded ends 43 and bearing against the outer sides of the visor walls 26, as shown in Figs. 6 and 7. The slots 45 are preferably inclined in the direction of the length of the side walls 26 which permits the supporting rods and the mirrors carried thereby to be either moved forwardly or backwardly relatively to the visor, also raised and lowered bodily and also permits of one end of this supporting rod to be raised more than the other in order to incline the mirrors at the required angle transversely of the visor which will give the driver or the passengers in the car the best line of vision to properly observe the traffic conditions in rear of the car.

The form of bracket for supporting each of the mirrors on the supporting rod 42, as shown in Figs. 5–8, comprises a body plate 47 arranged in an upright position back of the mirror and provided at its upper and lower edges with rearwardly projecting hooks 48, 49, engaging with the upper and lower edges of the mirror 27, supporting arms 50 projecting forwardly from opposite vertical edges of the body plate 47 and provided with openings which receive the supporting bar 42, and lips or flanges 51 arranged at the front ends of the arms 50 and provided with clamping screws 52 which engage with the front side of the supporting rod or bar 42 and hold the bracket against rotation thereon. If it is desired to turn the mirror vertically for the purpose of adapting the same to the line of vision best suited to give the driver a clear view of the roadway in rear of the car this is possible by loosening the screws 52 so that the bracket may be turned about the supporting rod 42 after which tightening of these screws will hold the bracket and the rear view mirror in place.

The mirror itself is held securely in place on the bracket by pressing its face rearwardly against the hooks 48, 49 by means of a pressing device consisting of a presser plate 53 bearing against the back of the mirror and provided at its opposite ends with guide lugs 54 engaging with horizontal slots 55 in the body of the bracket and clamping screws 56 engaging with threaded openings in the body plate 47 and operating to move the presser plate 53 against the back of the mirror.

In Figs. 2 and 6 a rear view from the car is obtained by the means of one or more short mirrors arranged at appropriate places either in one place or in a plurality of places side by side underneath the visor. A long rear view mirror 27ª may be employed which extends continuously from side to side of the visor and windshield below the visor and in front of the windshield, as shown in Figs. 10 and 12, all portions of which serve to give the driver and passengers in the car a clear view of the road conditions rearward of the car. Any suitable means may be provided for supporting an elongated mirror of this character, that shown in Figs. 10–13 being designed to support this mirror on the under side of the visor and consisting of a plurality of brackets which connect this mirror at different points in its length with the visor. Each of these brackets comprises an upright body plate 57 arranged at the back of the mirror and having upper and lower arms 58 and 59 projecting rearwardly and forwardly from the upper and lower edges of the body plate 57 and connected by means of rivets 60, 61 or other suitable means with the under side of the visor top 25, and upper and lower hooks 62, 63 struck out of the metal of the upper and lower arms 58 and 59 and engaging with the upper and lower edges of the full width rear view mirror 27ª. The latter is firmly held against these hooks 62, 63 by means of a clamping device comprising a U-shaped clip 64 passing around one edge of the body plate 57 and having a rear arm bearing against the back of the mirror and a front arm arranged in front of the body plate 57, and a clamping screw 65 passing through the front arm of the clip and through a threaded opening in the body plate 57 and bearing at its rear end against the front arm of the clip 64 so as to press the latter against the back of the rear view mirror 27ª.

In all of the various constructions shown, the rear view mirror is arranged in front of the windshield where the same is out of the path of passengers entering and leaving the car so that collision with this mirror and possible injuries resulting therefrom is avoided, and the mirror is mounted on the under side of the visor so that the same is fully protected against varying weather conditions and, therefore, remains in an efficient condition in which the driver or passengers will always be able to obtain a clear view of the roadway in rear of the car, therefore, increases safety in driving.

The installation of the rear view mirror on the exterior of the passenger car and attached to or incorporated with the visor renders the same entirely independent of the windshield and its adjusting mechanism, and therefore, permits the windshield to be opened and closed and function in the usual manner without in any way interfering with the rear view mirror.

I claim as my invention:—

1. A bracket for supporting a rear view mirror and having an upright central head on which said mirror is mounted, and upper and lower arms projecting rearwardly and forwardly from the upper and lower edges, respectively, of said head.

2. A bracket for supporting a rear view mirror and having an upright central head arranged in front of said mirror, hooks at the upper and lower edges of said head and engaging with the upper and lower edges of said mirror, an upper arm projecting rearwardly from the upper edge of said head and provided with a longitudinal slot, a lower arm projecting forwardly from the lower edge of said head and provided with a longitudinal slot, and bolts passing through the slots of said arms.

3. In a support for rear view mirrors adapted to be mounted in a visor of an automobile, a bracket comprising an upright portion, means for attaching a mirror to the upright portion, arms projecting from the upper and lower edges of said upright portion, slots in said arms, means passing through the slots for attachment and adjustment of the bracket to the visor, said arms being formed of flexible material whereby they may be bent for adjustment of the mirror.

WILLIAM LA HODNY.